United States Patent [19]

Drouvé et al.

[11] Patent Number: 5,185,422
[45] Date of Patent: Feb. 9, 1993

[54] POLYISOCYANATE SUSPENSIONS IN ISOCYANATE REACTIVE COMPOUNDS AND THEIR USE

[75] Inventors: Werner Drouvé, Leverkusen; Peter Höhlein, Kempen; Wolfhart Wieczorrek, Cologne, all of Fed. Rep. of Germany

[73] Assignee: Bayer Aktiengesellschaft, Leverkusen, Fed. Rep. of Germany

[21] Appl. No.: 862,854

[22] Filed: Apr. 3, 1992

[30] Foreign Application Priority Data

Apr. 25, 1991 [DE] Fed. Rep. of Germany ....... 4113416

[51] Int. Cl.$^5$ ............................................. C08G 18/48
[52] U.S. Cl. ........................................ 528/76; 528/77; 528/902
[58] Field of Search ............................. 528/76, 77, 902

[56] References Cited

U.S. PATENT DOCUMENTS

| | | | |
|---|---|---|---|
| 4,483,974 | 11/1984 | Grögler et al. | 528/68 |
| 4,619,985 | 10/1986 | Hess et al. | 528/49 |
| 4,677,181 | 6/1987 | Höhlein et al. | 528/74.5 |
| 4,757,105 | 7/1988 | Kopp et al. | 524/714 |

Primary Examiner—Maurice J. Welsh
Attorney, Agent, or Firm—Joseph C. Gil; Godfried R. Akorli

[57] ABSTRACT

Suspensions of solid polyisocyanates inactivated on the surface of adduct formation in organic, isocyanate reactive compounds as continuous phase, which suspensions are stable in storage at room temperature and heat curable and optionally contain auxiliary agents and additives, the continuous phase containing at least 10% by weight of ether group- and ester group-containing polyhydroxyl compounds having an (average) hydroxyl functionality of from 0.5 to 3 and an (average) hydroxyl number of from 15 to 150 constituting esterification products of (i) polyether polyols having an (average) hydroxyl functionality of from 3 to 8 and an (average) hydroxyl number of from 200 to 1000 with (ii) from 40 to 90 equivalents percent of inorganic monocarboxylic acids and the use of these suspensions for the production of coatings, adhesives or sealing compounds, in particular as underseal and doorseal compounds for motor vehicles.

3 Claims, No Drawings

POLYISOCYANATE SUSPENSIONS IN ISOCYANATE REACTIVE COMPOUNDS AND THEIR USE

BACKGROUND OF THE INVENTION

This invention relates to novel suspensions of solid polyisocyanates which are inactivated on the surface in isocyanate reactive compounds and to their use for various purposes.

It is already known to produce suspensions of solid polyisocyanates inactivated on their surface by adduct formation in compounds containing isocyanate reactive hydrogen atoms, in particular polyhydroxyl compounds, and to use these suspensions as heat cross-linkable, one-component systems for a wide variety of purposes (see e.g. EP-A 00 62 780, DE-OS 32 30 757 (=US-PS 4 483 974) or DE-OS 34 18 430 (=US-PS 4 619 985)). The systems known in the art often have the disadvantage of a tendency of forming blisters in the course of curing and a strong tendency of yellowing of coatings produced from such suspensions, when stored in daylight.

It has now surprisingly been found that the known suspensions can be substantially improved in these properties if the isocyanate reactive compounds forming the continuous phase comprise at least partially of polyhydroxyl compounds containing ether and ester groups, substantially corresponding to the compounds recommended in EP-A 0,209,823 (=US-PS 4,677,181) as reactants for free polyisocyanates or polyisocyanates blocked with blocking agents in the preparation of coating compounds or casting compounds. This finding is surprising since the suspensions according to the invention described below are still preferably based on aromatic polyisocyanates wherein a reduction in the tendency of yellowing in daylight was not to be expected, and in view of the fact that drying agents must be incorporated in the systems according to EP-A 0,209,823 in order to ensure satisfactory curing without the formation of blisters, as may be seen from the examples of practical application. Surprisingly, however, the use or inclusion of the ether esters of the above mentioned prior publication as continuous phase or as part of the continuous phase of suspensions of surface inactivated polyisocyanates results in a marked reduction in the tendency of blister formation in the course of curing, even without the addition of any drying agents.

SUMMARY OF THE INVENTION

This invention relates to suspensions of solid polyisocyanates inactivated on the surface by adduct formation in organic compounds containing at least two isocyanate reactive groups as continuous phase, which suspensions are stable in storage at room temperature and heat curable and optionally contain the auxiliary agents and additives used in coating technology, characterized in that the compounds forming the continuous phase contain at least 10% by weight of ether and ester group-containing polyhydroxyl compounds having an (average) hydroxyl functionality of from 0.5 to 3 and an (average) hydroxyl number of from 15 to 150 comprising the product of esterification of (i) polyether polyols having an (average) hydroxyl functionality of from 3 to 8 and an (average) hydroxyl number of from 200 to 1000 with (ii) from 40 to 90 equivalents per cent of organic monocarboxylic acids, the percentages being based on the hydroxyl groups of components (i) and the carboxyl groups of components (ii).

The invention also relates to the use of the suspensions according to the invention for the preparation of yellowing resistant, heat curable coatings, adhesives and sealing compounds for any substrates, in particular underseals and doorseals for motor vehicles.

The suspensions according to the invention substantially contain finely divided, surface inactivated solid polyisocyanates as a dispersed phase and organic compounds which are liquid at room temperature and contain isocyanate reactive groups as a continuous phase. The dispersions according to the invention may, of course, also contain auxiliary agents and additives known, for example, from lacquer technology. These additives may either be solid substances so that they form part of the dispersed phase (for example, pigments or fillers) or soluble substances so that they form part of the continuous phase (for example, plasticizers, catalysts and the like).

DETAILED DESCRIPTION OF THE INVENTION

The surface inactivated, solid, finely divided polyisocyanates forming the major component of the dispersed phase correspond to the compounds known in the art. The starting materials used may in particular be aromatic polyisocyanates which are solid at room temperature and insoluble in the polyhydroxyl component, for example, the uretdione diisocyanate based on 2,4-diisocyanatotoluene or on commercial mixtures thereof with up to 35% by weight, based on the isomeric mixture, of 2,6-diisocyanatotoluene, and the urea diisocyanate based on the above mentioned diisocyanatotoluenes, the preparation of which is described, for example, in DE-OS 3,638,148 (=US-PS 4,757,105). Other urea group-containing polyisocyanates which are solid at room temperature and obtainable according to this prior publication are also suitable as starting materials for the surface inactivated polyisocyanates. The above-mentioned uretdione diisocyanates and urea diisocyanates based on 2,4-diisocyanatotoluene are particularly preferred. The surface inactivation by adduct formation is also carried out by methods known in the art, using any inactivating agents known in the art. See, for example, the disclosure in EP-A 0 062,780, DE-OS 3,230,757 (US-PS 4,483,974) or DE-OS 3,418,430 (US-PS 4,619,985). Primary and/or secondary amines having (cyclo)aliphatically bound amino groups are preferred inactivating agents; particularly preferred are ethylene diamine, hexamethylene diamine, 4,4'-diamino-dicyclohexyl-methane and especially 4,4'-diamino-3,3'-dimethyl-dicyclohexylmethane.

The inactivation may be carried out in situ in the polyhydroxyl compounds or in part of the polyhydroxyl compounds which form the main component of the continuous phase of the suspensions according to the invention or it may be carried out in a separate reaction mixture using organic liquids which are solvents for the inactivating agent but not for the solid starting polyisocyanate, for example acetone or cyclohexane, as described in EP-A-O,062,780. Water is also a suitable reaction medium for the inactivating reaction.

To carry out the inactivation, the starting polyisocyanates are suspended in the liquid medium used as auxiliary agent and reacted with the inactivating agent, preferably at room temperature. The aminic inactivating agent is used in a quantity of from 0.01 to 25 equivalents percent, preferably from 0.1 to 8 and most preferably from 0.3 to 3 equivalents percent, based on the amino groups of the inactivating agent and the isocyanate groups of the suspended starting polyisocyanate. Inactivation is otherwise carried out in a manner completely analogous to the known processes described, for example, in the above mentioned publications.

The chemical nature of the polyhydroxyl compounds used as continuous phase is an essential feature of the invention. The continuous phase of the suspensions according to the invention contains at least 10% by weight of ether group- and ester group-containing polyhydroxyl compounds of the type mentioned above. These polyhydroxyl compounds which are essential for this invention are preferably compounds having an (average) hydroxyl functionality of from 0.5 to 3 and an (average) hydroxyl number of from 15 to 150 with a viscosity of 150 to 350 mPa.s/20° C.

Preparation of these polyhydroxyl compounds required for the invention is carried out completely analogously to the preparation of ether group- and ester group-containing polyhydroxyl compounds according of EP-A-O,209,823 (US-PS 4,677,181) and the starting materials mentioned in these prior publications are also used for the preparation of the ether group- and ester group-containing polyhydroxyl compounds according to the invention but the proportions of monocarboxylic acids may be higher than 70 equivalents percent, as will be clear from the figures for equivalent ratios mentioned above.

In addition to these ether group- and ester group-containing polyhydroxyl compounds according to the o invention, the continuous phase of the suspensions according to the invention may also contain other compounds containing isocyanate reactive groups known per se from polyurethane chemistry. Both known compounds containing alcoholic hydroxyl groups and known compounds containing primary or secondary amino groups which are at least difunctional in isocyanate addition reactions, may be used.

Examples of compounds known from polyurethane chemistry include polyhydroxy-polyesters, -polyethers, -polycarbonates and -polyacetals in the molecular weight range of from 400 to 6000, preferably from 800 to 6000 and most preferably from 1000 to 4500 containing 2 to 8, preferably 2 to 4 hydroxyl groups per molecule, the amino polyethers in the appropriate molecular weight range known from polyurethane chemistry, preferably containing 2 to 4 primary, aliphatically or aromatically bound amino groups, or also low molecular weight chain lengthening agents or cross-linking agents such as, for example, polyhydric alcohols in the molecular weight range of from 62 to 400, such as ethylene glycol, glycerol, trimethylolpropane, pentaerythritol, the low molecular weight alkoxylation products of these alcohols, aliphatic polyamines such as ethylene diamine or hexamethylene diamine, cycloaliphatic polyamines such as 4,4'-diamino-dicyclohexylmethane, aromatic polyamines such as 2,4- or 2,6-diaminotoluene, 4,4'-diaminodiphenylmethane, 4,4'-diamino-3,3'-dimethyl-diphenylmethane, 1-methyl-3,5 -diethyl-2,4-diaminobenzene or commercial mixtures thereof with the corresponding 2,6-diamino isomers (DETDA) or any mixtures of such compounds containing isocyanate reactive hydrogen atoms. The continuous phase of the suspensions according to the invention preferably contains at least 50% by weight of relatively high molecular weight compounds of the type mentioned above, in particular those in the molecular weight range of from 800 to 6000.

The suspensions according to the invention can contain the surface inactivated, pulverulent, solid polyisocyanates in a quantity corresponding to an equivalent ratio of isocyanate groups from stabilized isocyanate to amino or hydroxyl groups of the continuous phase of from 0.5:1 to 1.5:1, preferably from 0.8:1 to 1.5:1, (dimeric) diisocyanates containing uretdione groups entering into the calculation only with respect to the free isocyanate groups contained in them.

The suspensions according to the invention may, as already mentioned, contain auxiliary agents and additives known per se from lacquer technology, such as pigments, fillers, catalysts, levelling or flow improving agents, inert solvents or plasticizers.

The suspensions according to the invention are comparatively low viscosity systems which may be applied by the usual methods of lacquer technology. The suspensions are suitable as coating compounds, adhesives, sound absorbing agents or seam sealing compounds on metals or non-metallic materials. They are particularly preferred as underseals and doorseals for motor vehicles. They are generally cured by 15 to 40 minutes' heating to 110° to 150° C.

All the figures given in "parts" in the following Examples refer to weight.

EXAMPLES

Example 1

(Preparation of a hydroxyl compound containing ether and ester groups)

7665 g of soya oil fatty acid and 3826.8 g of a propoxylated sorbitol having a viscosity of 16,000 mPa.s at 25° C., an equivalent weight of 125 and an OH number of 425 mg of KOH/g of substance are weighed into a 15 liter stirrer vessel equipped with stirrer, heating means, nitrogen inlet tube, column and water discharge means under a stream of nitrogen of 5 to 6 liters per hour.

The reaction mixture is then heated to 200° C. for about 3 hours. During this time, the temperature measured at the head of the column must not exceed 105° C. As soon as the sump temperature reaches 200° C. and the head temperature falls below 90° C., the column is first removed and the stream of nitrogen is then increased to 30 liters per hour. Condensation is continued until an acid number of 1.4 kg of KOH per g of substance is obtained. The reaction mixture is then cooled to 100° C. and the finished product is filtered through a cloth filter. A polyhydroxyl compound suitable for use according to the invention is obtained. It has an iodine cooler number of 2, a viscosity of 225 mPa.s at 20° C., an OH number of 23 mg of KOH per g of substance and an acid number of 4.5 mg of KOH per g of substance.

Example 2

(Preparation of a hydroxyl compound containing ether and ester groups)

The procedure is the same as in Example 1 but the quantity of soya oil fatty acid weighed in is 6852 g and that of propoxylated sorbitol is 4586 g. A polyhydroxyl compound suitable for use according to the invention is obtained, having an iodine color number of 2, a viscosity of 280 mPa.s at 23° C., an OH number of 66 mg of KOH per g of substance and an acid number of 1.7 mg of KOH per g of substance.

Example 3

(Preparation of a surface inactivated polyisocyanate)

0.65 Parts of 4,4'-diamino-3,3'-dimethyl-dicyclohexylmethane are dissolved in 100 parts of a polyether triol having a molecular weight of 3000 prepared by the propoxylation of glycerol, and 88.7 parts of dimeric, finely powdered tolylene-2,4-diisocyanate are suspended therein with intensive stirring. A suspension of a surface inactivated polyisocyanate in which the polyether triol forms the continuous phase is thus obtained.

Example 4 Comparison example

100 Parts of the polyether triol from Example 3, 6.2 parts of a commercial mixture of 80% by weight of 1-methyl-3,5-diethyl-2,4-diaminobenzene and 20% by weight of 1-methyl-3,5-diethyl-2,6-diaminobenzene (DETDA), 3.2 parts of titanium dioxide (rutile), 29.2 parts of ground heavy spar, 29.2 parts of microtalc and 0.8 parts of bi-tris-neodecanoate are dispersed in a dissolver at about 40° C. After the dispersion has cooled to about 25° C., 90.2 parts of a polyisocyanate suspension described in Example 2 are added with stirring and mixed (equivalent ratio NCO groups:NCO reactive groups = 1.03:1).

Example 5

The procedure is the same as in Example 4 but 20 parts of a polyether ester according to Example 1 are added with stirring in addition to the polyether triol (equivalent ratio of NCO groups:NCO reactive groups = 1:1).

Example 6

The procedure is the same as in Example 4 but 20 parts of a polyether ester according to Example 2 are added with stirring in addition to the polyether triol. (Equivalent ratio NCO groups:NCO reactive groups = 0.85:1).

Example 7 Use

Coating compounds corresponding to Examples 4 to 6 were applied to previously primed steel sheet in a layer thickness of about 550 μm and cured for 30 minutes at 120° C. The product properties relevant for use as underseals or doorseals are compared in the Table below. The comparative data clearly show that the system according to the invention has considerable advantages over the Comparative example both in the viscosity for application, in the surface characteristics and in the resistance to yellowing.

TABLE

| | Example 4 | Example 5 | Example 6 |
|---|---|---|---|
| Processing viscosity at 23° C. (mPa.s) | 2750 | 1980 | 2130 |
| Adherence to primed sheet steel | good | good | good |
| Resistance to stone chipping | very good | very good | very good |
| Surface characteristics after stoving: | | | |
| 15 minutes | nothing to report | nothing to report | nothing to report |
| 1 Hour | many blisters | nothing to report | nothing to report |
| 2 Hours | excessive number of blisters | nothing to report | nothing to report |
| 8 Hours | very many blisters | nothing to report | nothing to report |
| 24 Hour interval between application and stoving | many blisters | nothing to report | nothing to report |
| Color change of the coating after 2 months' storage in daylight | strong yellow discoloration | virtually unchanged | virtually unchanged |

What is claimed is:

1. A suspension of a solid polyisocyanate inactivated on the surface by adduct formation in an organic compound having at least two isocyanate reactive groups, as a continuous phase, which suspension is stable in storage at room temperature and heat curable and optionally contains an auxiliary agent and an additive, characterized in that the compound which forms the continuous phase contains at least 10% by weight of an ether group- and ester group-containing polyhydroxyl compound having an (average) hydroxyl functionality of from 0.5 to 3 and an (average) hydroxyl number of from 15 to 150, and comprises the esterification product of (i) a polyether polyol having an (average) hydroxyl functionality of from 3 to 8 and an (average) hydroxyl number of from 200 to 1000 with (ii) from 40 to 90 equivalents percent of an organic monocarboxylic acid, the percentages being based on the hydroxyl groups of component (i) and the carboxyl groups of component (ii).

2. A yellowing resistant, heat curable composition selected from the group consisting of coatings, adhesives or sealing compounds for a substrate containing a suspension according to claim 1.

3. The curable composition of claim 1 which is an underseal or a doorseal for motor vehicles.

* * * * *